Patented Sept. 13, 1932

1,877,374

UNITED STATES PATENT OFFICE

GEORGE WITTY, OF NEW YORK, N. Y., ASSIGNOR TO STRUCTURAL PRODUCTS CORPORATION, A CORPORATION OF DELAWARE

MOISTURE ABSORBING COMPOSITION AND METHOD OF MAKING THE SAME

No Drawing.　　　Application filed June 18, 1930. Serial No. 462,137.

This invention has reference to the elimination of the moisture, free acid and alkalis occurring in the newly plastered surfaces of various kinds, such as lime, gypsum and cement plaster, and it is intended to produce a composition which will free the newly plastered surfaces from such undesired drawbacks and rend the same dry, free from acid and alkalis and ready to be painted or decorated. Various attempts to overcome this drawback, heretofore made have not been successful.

It is well known that paints, especially oil paints can not be applied to the newly plastered surfaces on account of the moisture, free acid and alkalis found in the lime. It has been found that even after the newly plastered walls have been left to dry for a long period of time, still a quantity of moisture, free acid and alkalis remain in the walls and cause the paint to turn yellow, blister and peel off in a relatively short time. This change in color, blistering and peeling off, must be ascribed to the action of the acid of the oil and pigments in the paint which react with the free acid and alkalis of the lime.

In accordance with this invention, it is possible to absorb the moisture, neutralize and rend harmless any quantity of acid and alkalis from the plastered surfaces, by coating the same with a coat of my improved moisture absorbing compound, which will prepare the surface to be painted or decorated without the necessity of delaying the work for a long period of time.

Surfaces treated with my improved moisture absorbing compound have greater advantages over those treated with sizing or shellac. All of the ingredients used in the preparation of my moisture proof composition are chemically stable and do not take on oxygen from the air. Within twenty minutes all the volatile materials have evaporated, leaving a hard tough film that is not affected by moisture or climatic changes.

My improved moisture absorbing composition may be manufactured in a clear solution or in paint form and thinned to the necessary body for spraying or brushing.

The ingredients and proportions thereof used for the improved moisture absorbing composition are as follows:—A spirit soluble gum, from 20 to 60 parts by weight; composite titanium barium-pigment, from 5 to 20 parts by weight; zinc oxide or other basic compound of zinc, from 5 to 10 parts by weight; denatured alcohol, from 25 to 50 parts by volume; xylene, from 50 to 75 parts by volume; and toluene, from 10 to 20 parts by volume.

In the preparation of the composition, the gum is dissolved in the presence of denatured alcohol and xylene. The titanium barium base and the zinc are placed into a paint mixing machine and made into a homogeneous composition in the presence of toluene, then added to the dissolved gum solution and thoroughly mixed, after which the composition is allowed to settle, when it is ready for use.

If it is desired to color the moisture absorbing composition, it is merely necessary to add the desired coloring matter thereto.

Changes in details may be made as to the exact proportions of the ingredients used.

What I claim as new is:—

1. A moisture absorbing composition for newly plastered surfaces consisting of a mixture of a spirit soluble gum, titanium-barium pigment, zinc oxide, denatured alcohol and xylene.

2. A moisture absorbing composition for newly plastered surfaces consisting of from twenty to sixty parts by weight of a spirit soluble gum and five to twenty parts by weight of titanium-barium pigment and from five to ten parts by weight of zinc oxide and twenty-five to fifty parts by volume of denatured alcohol and from fifty to seventy-five parts by volume of xylene.

In testimony whereof, I affix my signature.

GEORGE WITTY.